United States Patent
Apfelbeck et al.

(10) Patent No.: US 6,315,421 B1
(45) Date of Patent: Nov. 13, 2001

(54) INTERIOR REARVIEW MIRROR FOR VEHICLES

(75) Inventors: Robert Apfelbeck, Plattling; Jens Mertens, Stuttgart, both of (DE)

(73) Assignee: Reitter & Schefenacker GmbH & Co. KG, Esslingen (DE)

( * ) Notice: Subject to any disclaimer, the term of this patent is extended or adjusted under 35 U.S.C. 154(b) by 0 days.

(21) Appl. No.: 09/677,386

(22) Filed: Oct. 2, 2000

(30) Foreign Application Priority Data

Oct. 7, 1999 (DE) .......................................... 299 17 715 U

(51) Int. Cl.⁷ .................................................. G02B 7/182
(52) U.S. Cl. ........................ 359/871; 359/872; 359/873; 359/875; 359/876
(58) Field of Search .................................... 359/871, 872, 359/873, 875, 876, 877; 248/481, 475.1

(56) References Cited

U.S. PATENT DOCUMENTS 6,068,380 * 5/2000 Lynn et al. ............................ 359/871

\* cited by examiner

*Primary Examiner*—Mohammad Sikder
(74) *Attorney, Agent, or Firm*—Gudrun E. Huckett

(57) ABSTRACT

An interior rearview mirror for motor vehicles has a mirror support, a mirror housing, and a ball joint having a ball head, wherein mirror housing and the mirror support are connected to one another by the ball joint. At least one electrically operated component is mounted in the mirror housing and has an electrical line connected to a power source for supplying electric current to the at least one electrically operated component. The ball head has at least one slot located laterally in a side of the ball head. The slot allows lateral passage of the electric line into the ball head.

9 Claims, 2 Drawing Sheets

INTERIOR REARVIEW MIRROR FOR VEHICLES

BACKGROUND OF THE INVENTION

1. Field of the Invention

The invention relates to an interior rearview mirror for vehicles, in particular, motor vehicles, comprising a mirror support and a mirror housing which is connected by means of a ball joint comprising a ball head with the mirror support, and further comprising at least one electrically operated part that is connected by an electric line to a power/voltage source.

2. Description of the Related Art

It is known to provide electrically operated components in the mirror housing. The cables or lines, required for power/voltage supply and coming from the power/voltage source of the vehicle, extend along the mirror support and through the hollow mirror housing to the component to be operated. The hollow ball head is provided with a bore through which the cable must be threaded in a cumbersome way. Since the ball head is relatively small the cable must first be guided through the ball head before the required plug connectors can be mounted on the cable. The assembly is thus complex, difficult, and cost-intensive.

SUMMARY OF THE INVENTION

It is an object of the present invention to develop an interior rearview mirror of the aforementioned kind such that the cable can be mounted easily and quickly.

In accordance with the present invention, this is achieved in that the ball head has at least one slot via which the electrical line can be inserted from the side into the ball head.

As a result of the configuration according to the invention, the cable or electric line can be provided with one or more plug connectors before it is mounted. The thus preassembled cable is inserted via the slot from the side into the hollow ball head. The plug connector(s) provided on the cable do not interfere during insertion so that a simple and thus cost-efficient assembly is possible. The interior rearview mirror can be mounted with minimal expenditure and minimal costs because the cumbersome, time-consuming threading of the cable into a bore of the ball head is no longer required and the plug connector(s) must not be attached later to the cable. As a result of the configuration according to the invention, one of the most labor-intensive working steps on the assembly line can be saved during mounting of the interior rearview mirror.

DESCRIPTION OF THE PREFERRED EMBODIMENTS

Figure 2:
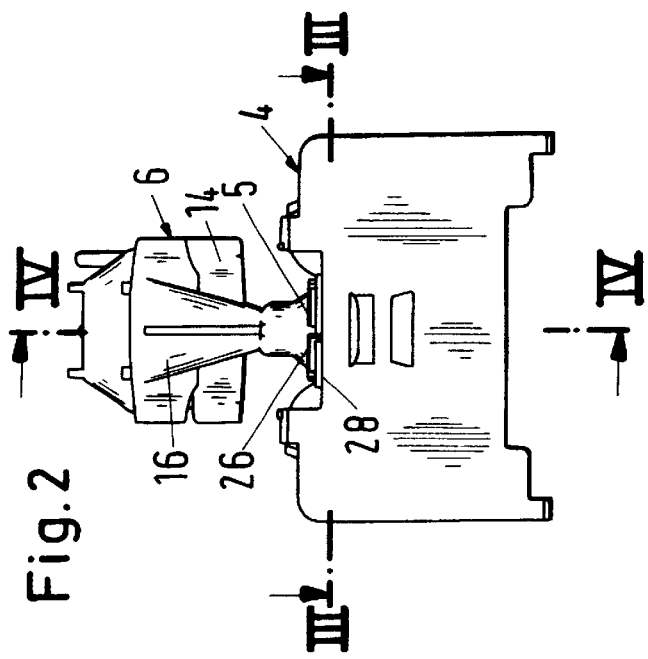
FIG. 2 is a view of the interior rearview mirror according to FIG. 1 without the mirror housing in a view in the direction of arrow II of FIG. 1.

The interior rearview mirror according to FIGS. 1 to 7 has a mirror housing 1 whose housing opening 3 is closed off by an electrochromic mirror glass 2. In the housing 1 an adjusting part 4 is mounted which is connected by a ball joint 5 to the mirror support 6. The interior review mirror is fastened by means of the mirror support 6 on the vehicle (not shown). The driver of the vehicle can adjust the interior review mirror according to the viewing conditions. The mirror support 6 projects through an opening 7 into the upper side of the housing 1.

The mirror support 6 is covered by a mirror support cover 8 which has a tapered end 8' extending into the upper housing opening 7.

For supplying power to the electrochromic mirror glass 2 and possibly other devices, such as the sender of an electric garage door opener, and for the lines via which a possibly present electrochromic exterior mirror can be controlled, a cable 10 is arranged in the mirror support 6. With the switch S the sender for the electric garage door opener or a reading lamp (not shown) provided on the interior rearview mirror can be actuated.

Figure 3:
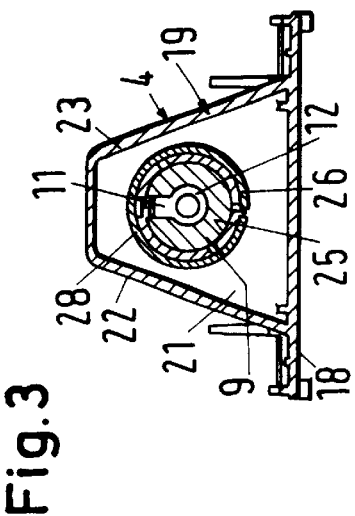
FIG. 3 is a sectional view along the section line III—III of FIG. 2.
Figure 1:
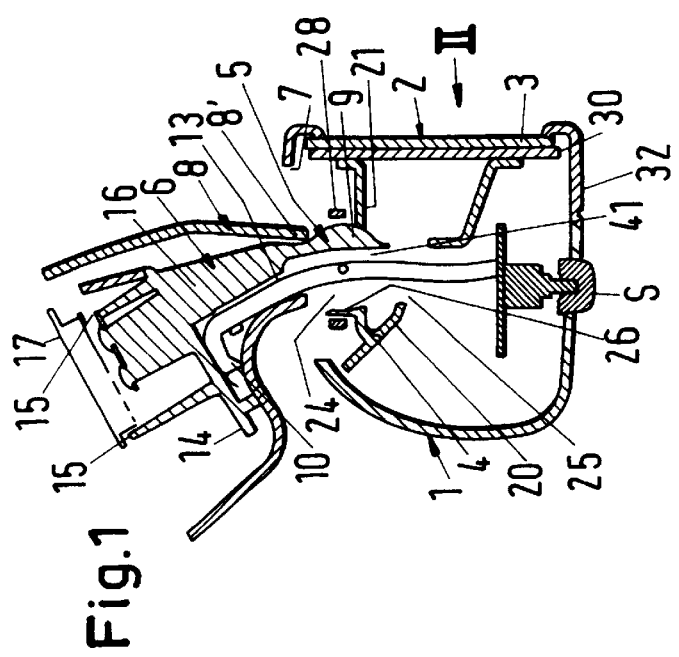
FIG. 1 is a sectional view of the interior rearview mirror according to the invention.
Figure 6:
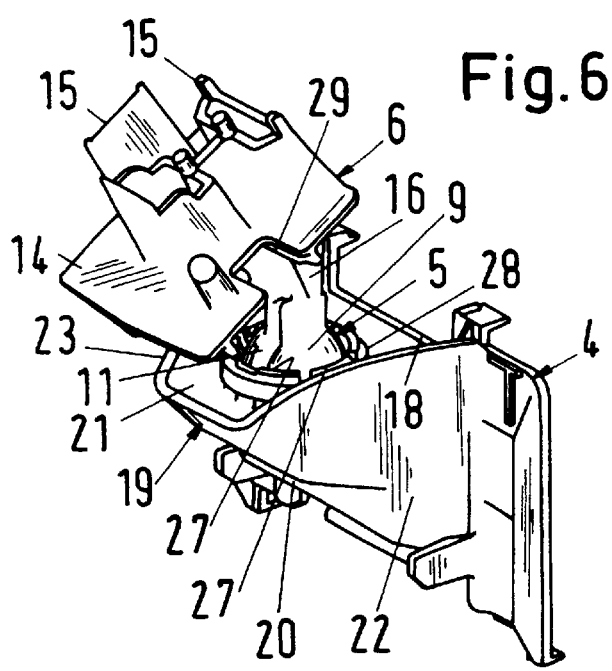
FIG. 6 is a perspective illustration of the mirror support with adjusting plate of the interior rearview mirror according to the invention.

The mirror support 6 has an intermediate plate 14 (FIG. 6) past which vertical profiled stays 15 project in the upward direction. A neck piece 16 projects past the intermediate plate 14 in the downward direction toward the adjusting part 4 and is provided at its end with a ball head 9 of the ball joint 5. By means of the vertical stays 15 the mirror support 6 is fastened on the holder 17 (FIG. 1) which is attached in the interior of the motor vehicle. The adjusting plate 4 has a front wall 18 past which a funnel-shaped receptacle 19 with trapezoidal cross-section (see FIG. 3) extends. Transverse walls 20, 21, which are positioned at an acute angle relative to one another, project from the front wall 18, wherein the lower transverse wall 20 projects at an acute angle and the upper transverse wall 21 perpendicularly to the front wall 18. The two walls 20, 21, as can be seen in FIGS. 3 and 6, have a trapezoidal contour when viewed in a plan view. The two transverse walls 20, 21 are connected with one another by sidewalls 22, 23 at the lateral edges that converge in a direction away from the front wall 18. The transverse walls 20, 21 have substantially centrally positioned through openings 24 and 25 through which the cable 10 extends. The opening 25 of the upper transverse wall 21 is delimited by an annular collar 26 which surrounds the ball head 9 when the mirror is assembled. The annular collar 26 has several axially extending spring stays or tongues 27, arranged successively in the circumferential direction of the collar with preferably identical spacing between them. These tongues 27, when mounting the ball head 9, can spread spring-elastically and subsequently return into their initial position and surround the ball head 9 in a clamping fashion.

Figure 4:
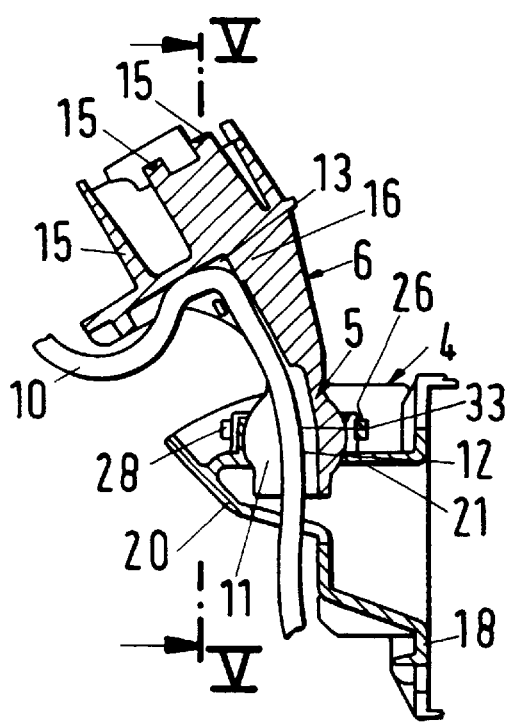
FIG. 4 is a sectional view along the section line IV—IV of FIG. 2.
Figure 5:
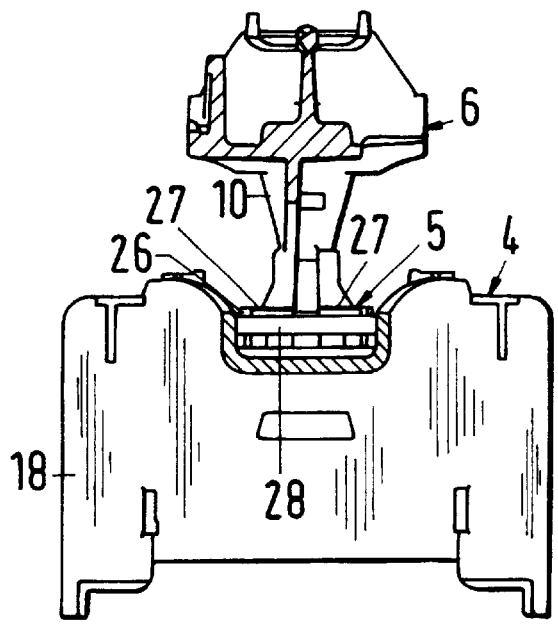
FIG. 5 is a sectional view along the section line V—V of FIG. 4.

In order to prevent an undesirable movement of the mirror support 6 relative to the adjusting part 4, the annular collar 26 is surrounded by a clamping ring 28 which forces the spring tongues 27 of the annular collar 26 tightly against the ball head 9. At the front wall 18 of the adjusting part 4 a plate-shaped support 30 for the mirror glass 2 is fastened. The adjusting part 4 is provided with a socket 33 at the level of the annular collar 26, and the ball head 9 provided on the mirror support 6 can be snapped into position in it (FIG. 4).

Figure 7:
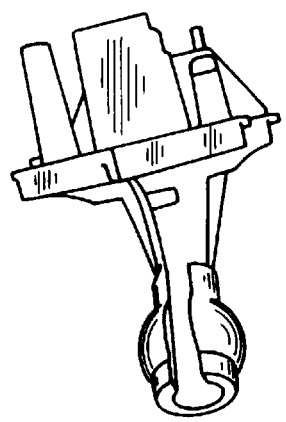
FIG. 7 shows the mirror support in a perspective illustration.

The ball head 9 is provided with a longitudinal slot 11 (FIG. 3 and FIG. 7). It extends over the entire height of the ball head 9 and opens into a central opening 12 of the ball head 9. In the other part of the mirror support 6 the longitudinal slot 11 adjoins a recess 13 of the neck piece 16 through which the cable 10 can be guided to the motor. The longitudinal slot 11 and the recess 13 are provided on the side of the mirror support facing away from the mirror glass 2. The width of the longitudinal slot 11 is approximately identical or slightly greater than the thickness of the cable 10. Since the slot 11 opens outwardly, the cable 10 can be easily inserted from the exterior through the longitudinal slot 11 laterally into the opening 12 of the ball head 9. The cable 10 finds sufficient space in the recess 13 so that it can be mounted in a space-saving way within the interior rearview mirror. Since the cable 10 can be inserted by means of the longitudinal slot 11 laterally into the mirror support 6, respectively, the ball head 9, the cable 10 can be pre-assembled. The plug connectors, coupling pieces and the like mounted on the pre-assembled cable 10 do not interfere when inserting the cable so that the cable 10 can be mounted in a simple way and in a very short time so that a considerable portion of the mounting costs can be saved.

The intermediate plate 14 of the mirror support 6, as shown in FIG. 6, is provided with a cutout 29 opening toward the edge through which the cable 10 can be guided out of the recess 13 to the exterior.

While specific embodiments of the invention have been shown and described in detail to illustrate the inventive principles, it will be understood that the invention may be embodied otherwise without departing from such principles.

What is claimed is:

1. An interior rearview mirror for motor vehicles, the mirror comprising:
    a mirror support (6);
    a mirror housing (1);
    a ball joint (5) having a ball head (9), wherein said mirror housing (1) and said mirror support (6) are connected to one another by said ball joint (5);
    at least one electrically operated component mounted in said mirror housing (1) and having an electrical line (10) configured to be connected to a power source for supplying electric current to said at least one electrically operated component;
    wherein said ball head (9) has a central opening (12) and at least one slot (11) located laterally in a side of said ball head (9), wherein said at least one slot (11) opens into said central opening and is configured to allow lateral passage of said electric line (10) into said ball head (9).

2. The mirror according to claim 1, wherein said ball head (9) has a length in a direction between said mirror support (6) and said mirror housing (1), wherein said slot (11) has a length extending substantially entirely over said length of said ball head (9).

3. The mirror according to claim 1, wherein said slot (11) has a width matching approximately a width of said electric line (10).

4. The mirror according to claim 1, wherein said mirror support (6) has a recess (13) and wherein said slot (11) opens into said recess (13).

5. The mirror according to claim 1, comprising at least one securing part (26) configured to secure said electric line (10) in said ball head (9).

6. The mirror according to claim 5, wherein said mirror housing (1) has an adjusting part (4) with an annular collar (26) and wherein said annular collar (26) is said securing part (26).

7. The mirror according to claim 6, wherein said annular collar (26) has several spring tongues (27) successively arranged in a circumferential direction of said annular collar (26) at a spacing to one another, wherein said spring tongues (27) rest against said ball head (9) with tension.

8. The mirror according to claim 7, further comprising a clamping ring (28) configured to surround said spring tongues (27) and force said spring tongues (27) against said ball head (9).

9. The mirror according to claim 6, wherein said adjusting part (4) has a socket (33) forming a part of said ball joint (5) and configured to receive said ball head (9), wherein said socket (33) is arranged at a level of said securing part (26).

* * * * *